United States Patent [19]

Lehr et al.

[11] Patent Number: 4,868,247

[45] Date of Patent: Sep. 19, 1989

[54] CHLORINATED POLYVINYL CHLORIDE BLENDS HAVING LOW MELT VISCOSITIES

[75] Inventors: Marvin H. Lehr, Akron; Paul P. Nicholas, Broadview Heights, both of Ohio

[73] Assignee: The B. F. Goodrich Company, Akron, Ohio

[21] Appl. No.: 148,836

[22] Filed: Jan. 27, 1988

[51] Int. Cl.$^4$ ............................................. C08L 27/24
[52] U.S. Cl. ...................................... 525/239; 525/931
[58] Field of Search ................................ 525/239, 931

[56] References Cited

U.S. PATENT DOCUMENTS

| | | | |
|---|---|---|---|
| 3,006,889 | 10/1961 | Frey | 525/239 |
| 3,058,943 | 10/1962 | Gray | 525/239 |
| 3,360,590 | 12/1967 | Liepins | 525/292 |
| 3,923,720 | 12/1975 | Coaker | 524/311 |
| 4,076,629 | 2/1978 | Beaumont | 524/528 |
| 4,302,555 | 11/1981 | Falk | 525/239 |
| 4,304,884 | 12/1981 | Okamoto | 525/239 |
| 4,710,533 | 12/1987 | Neuman | 525/239 |

FOREIGN PATENT DOCUMENTS 1171485 8/1985 U.S.S.R. .............................. 525/239

Primary Examiner—John C. Bleutge
Assistant Examiner—David Buttner
Attorney, Agent, or Firm—James R. Lindsay; Daniel J. Hudak

[57] ABSTRACT

The melt viscosity of chlorinated polyvinyl chloride is reduced by blending it with small amounts of low molecular weight polystyrene type polymers. Such blends also exhibit good mechanical compatibility.

13 Claims, No Drawings

CHLORINATED POLYVINYL CHLORIDE BLENDS HAVING LOW MELT VISCOSITIES

FIELD OF THE INVENTION

The present invention relates to chlorinated polyvinyl chloride-polystyrene blends having improved melt flow and good mechanical compatibility.

BACKGROUND ART

Chlorinated polyvinyl chloride resin is often used in applications where its high heat deflection resistance is desired, as in hot water piping systems. However, one of its drawbacks is a high melt viscosity which makes it difficult to process as in a two roll mill, a Banbury, an extruder, an injection molder, and the like.

U.S. Pat. No. 3,360,590 to Liepins relates to chlorinated polyvinyl chloride resins which are overpolymerized with a vinyl aromatic monomer such as styrene. Improved properties are obtained such as processability, impact resistance, and tensile strength.

U.S. Pat. No. 3,923,720 to Coaker et al., relates to blends of polyvinyl chloride and various acrylate homopolymers or copolymers to improve their workability, flow, and heat distortion temperature.

U.S. Pat. No. 4,076,629 to Beaumont et al., relates to the addition of a high molecular weight aromatic hydrocarbon polymers such as polystyrene to low crystalline chlorinated polyolefins to form a sizing solution which is utilized to treat textile yarns to avoid tackiness.

U.S. Pat. No. 4,302,555 to Falk relates to blends of polyvinyl chloride and polystyrene which are compatibilized by the addition of from 1 to 20 percent by weight of a chlorinated butadiene-styrene block copolymer.

SUMMARY OF THE INVENTION

It is therefore an aspect of the present invention to provide a chlorinated polyvinyl chloride (CPVC) blend which has a reduced melt viscosity. Melt viscosity reductions, even in excess of 50 percent, are obtained by blending CPVC with small amounts of a low molecular weight polystyrene type polymer at a temperature of from about 180° C. to about 260° C. A heterogeneous system is formed wherein the polystyrene type polymer is dispersed as a separate phase. The addition of the low molecular weight polystyrene type polymer also provides mechanical compatibility of the CPVC blend so that the cohesiveness thereof, that is the ability to adhere to itself, under stress is maintained or increased. The incorporation of the polystyrene into the chlorinated polyvinyl chloride also results in smoother extruded parts.

DETAILED DESCRIPTION OF THE INVENTION

The chlorinated polyvinyl chloride (CPVC) resins of the present invention are generally in the form of a powder and contain from about 57 or 58 percent to about 72 percent by weight and preferably from about 61 percent to about 72 percent by weight of chlorine based upon the total weight of the polymer. The preparation of CPVC is well known in the art and to the literature. CPVC containing high amounts of chlorine inherently has a high melt viscosity and is difficult to fuse, which enhances the formation of undesirable surface cracks. This limits its use somewhat since it also causes poor mechanical compatibility. That is, the cohesiveness of the material to adhere (stick together) under stress is poor.

According to the concepts of the present invention, it has been found that the mechanical compatibility can be maintained or increased and the melt viscosity dramatically and unexpectedly decreased by blending CPVC with small amounts of low molecular weight polystyrene type polymers. By the term "polystyrene type polymers" it is meant polymers such as polystyrene or an alkyl substituted polystyrene wherein the substituent has from 1 to 4 carbon atoms. That is, the alkyl group is substituted only on the benzene ring. Thus, polymers such as poly(alphamethylstyrene) are not utilized. Specific examples of suitable polystyrene type polymers include poly(para-methylstyrene), polystyrene, poly(para-isopropylstyrene), and the like with polystyrene being preferred. The polystyrene type polymer is generally utilized in powder form and has a very low number average molecular weight as from about 800 to about 10,000, and preferably from about 1,500 to about 5,000. Inasmuch as very low molecular weight polymers are utilized, they are preferably prepared via anionic polymerization. The glass transition temperature (tg) of such polymers should be less than 100° C. and usually from about 60° C. to about 90° C. as determined by heating the example at 400/min. and taking the temperature at one-half the heat capacity change at the transition temperature. In order to obtain the large reduced melt viscosities of the present invention, not only is it important that low molecular weight type polystyrenes be used but also in small amounts. The amount of polystyrene type polymer required is generally from about 0.5 to about 10 parts, desirably from about 1 part to about 8 parts by weight, and preferably from about 2 parts to about 5 parts by weight for every 100 parts by weight of the CPVC resin.

The CPVC blend of the present invention is prepared by heating both components thereof to above their glass transition temperatures and mixing the same along with any conventional compounding aids in a suitable mixer such as a two roll mill, a compounding extruder, a banbury, and the like. Suitable mixing temperatures are generally from about 180° C. to about 260° C. with from about 230° C. to about 250° C. being preferred. The result is a melt processed blend. More specifically, the morphology is a heterogeneous system wherein separate and distinct phases exist, that is a continuous CPVC phase and a discontinuous polystyrene type polymer phase.

The blended CPVC compositions of the present invention result in a dramatic reduction in the melt viscosity as measured by apparent viscosity. Reductions in melt viscosity of at least 10 percent, desirably at least 25 percent, and more preferably at least 50 percent are readily obtained. Apparent viscosity reductions of from about 25 percent to about 40 percent are often obtained. In addition to the viscosity reduction, a small degree of solubility of the CPVC in polystyrene exists. Thus, good wetting is obtained between the polystyrene type polymer interface with the CPVC polymer such that the cohesiveness of the CPVC material to adhere together under stress is improved.

The CPVC blend can contain various conventional compounding aids in desired amounts as known to the art as well as to the literature. For example, various conventional lubricants such as oxidized polyethylene, paraffin wax, and the like can be utilized. Various conventional stabilizers can be utilized such as various organo tins, for example dibutyltin, dibutyltin-S-S'-bis-(isooctylmercaptoacetate), dibutyltin dilaurate, and the like. Various impact modifiers can be utilized such as various polymethylmethacrylates grafted on polybutylacrylates, and the like. Examples of suitable fillers include titanium dioxide, mica, and the like.

The CPVC blends can be used whenever reduced melt viscosities, improved mechanical compatibility and the like are desired such as in heretofore difficult CPVC extrusion and injection molding processes. Suitable end uses include sheets, trays, shrouds as for fans, piping, computer housings, and the like.

The invention will be better understood by reference to the following examples.

| Formulation | |
|---|---|
| CPVC (TempRite ® 627 × 563 made by B F Goodrich), 67% Chlorine | 95 |
| Polystyrene | 5 |
| Thermolite ® 31 (a tin stabilizer made by M & T Chemicals) | 3 |
| Polyethylene (Allied AC629A) | 0.5 |

The above polystyrene was made by anionic polymerization utilizing a lithium alkyl initiator. The polymers were essentially monodispersed in molecular weight with Mw/Mn being less than 1.1 as determined by gel permeation chromatography.

The various powdered ingredients were mixed in a blender for 2 minutes, fused at 180° C. on a Getty electrically heated 2-roll 4 inch mill. Tensile sheets were molded at 210° C. Tensile specimens were routed and milled. The samples containing various different molecular weights of polystyrene were extrusion tested with an Instron rheometer. Samples one and one-half inches long were bent 180 degrees to test for ductility. This is a good test for mechanical compatibility of the ingredients. Three samples of each molecular weight of polystyrene were tested. If all three samples survive without breaking, the sample was designated ductile (D). If all samples failed, the sample was labeled brittle (B). A mixture of two results was called brittle-ductile (B-D), otherwise the samples were termed brittle. The apparent viscosity was calculated from pressure on the samples at the end of the extrusion, the die geometry, and shear rate. The units of viscosities are in kilopascal-seconds. The results are set forth in Table I.

TABLE I

| Mw | Extrusion Behavior at 210° C. # | | | | | | | | | |
|---|---|---|---|---|---|---|---|---|---|---|
| | No PS | 800 | 2100 | 4400 | 6520 | 8120 | 9000 | 24200 | 36000 | 47900 |
| Tg(°C.) of PS | — | −5 | 62 | 95 | 96 | 97 | 101 | 105 | 105 | 109 |
| Tg(°C.) of blend | 116.5 | 107 | 60, 115 | nd | nd | nd | nd | nd | nd | nd |
| 180° bend | B-D | D | D | D | B | B | B | B | B | B-D |
| Viscosity (kPa-s) | 1.89 | 1.35 | 0.89 | 0.88 | 1.08 | 1.05 | 1.05 | 1.22 | 1.21 | 1.31 |

\# L/D = 10, D = 0.127 cm, shear rate (uncorrected) = $279 s^{-1}$
B = brittle
D = ductile
nd = not determined As apparent form Table I, low viscosities were obtained utilizing from about 800 to about 10,000 molecular weight polystyrene. Thus, dramatic reductions in viscosity at elevated temperatures were achieved.

The results in Table I also show the glass transition temperatures (Tg) of both the neat polystyrenes and some blends with CPVC, as determined with a Perkin Elmer DSC-2 instrument at a 40° C./min heating rate. The control sample, containing no polystyrene gave a single Tg at 116.5° C. However, when 5 weight percent PS with a Mw of 800 was added, only a single Tg was again obtained, but depressed 9.5° C. to 107° C. This shows plasticization of the CPVC by the PS was completely dissolved in the CPVC and is evidence of compatibility of the two polymers.

At a polystyrene molecular weight of 2100 the blends showed two distinct Tgs, the higher one at 115° C. corresponding to the pure CPVC phase, and the lower one at 60° C. is essentially that of the pure polystyrene phase. Although at this Mw there was no measurable solubiity of the two polymers by DSC, the observation that the blend exhibited ductile breaks shows that there was good adhesion between the two phases.

The ductility of the composition is also a function of weight percent polystyrene as well as molecular weight as shown in Table II. The sum of the amounts of CPVC plus polystyrene amounted to 100. The amount of polystyrene in the formulation is expressed as weight percent of that total, exclusive of the other compounding ingredients.

TABLE II

| | Effect of Polystyrene Concentration on Extrudate Behavior | | | | | | | | | | |
|---|---|---|---|---|---|---|---|---|---|---|---|
| Mw PS | 800 | | | 2100 | | | 4400 | | | 24200 | | |
| % PS w/w | 2 | 5 | 8 | 2 | 5 | 8 | 2 | 5 | 8 | 2 | 5 | 8 |
| 180° Bend | B | D | D | D | D | B | D | D | B | D | B | B |
| Viscosity (kPa-s) | 1.67 | 1.44 | 1.21 | 1.64 | 0.89 | 0.63 | 1.39 | 0.88 | 0.63 | 1.55 | 1.22 | 0.89 |

Another test was made utilizing CPVC resin containing 70 weight percent chlorine. The formulation was otherwise the same. The recipes were fused on a mill at 210° to 230° C., and the temperature increased as the molecular weight of the polystyrene increased. The extrusions were run at 220° C. with the other conditions being the same as described hereinabove. The results are set forth in Table III.

TABLE III

| | Extrusion Behavior of 70 Weight % Chlorine CPVC/PS Blends | | | |
|---|---|---|---|---|
| Mw | No PS | 800 | 3600 | 9100 |
| % PS w/w | 0 | 5 | 5 | 5 |
| 180° Bend | D | D | B | B |
| Viscosity (kPa-s) | 2.00 | 1.42 | 0.92 | 1.47 |

As apparent from Table III, the utilization of a polystyrene having a molecular weight within applicant's noted range, i.e., 3,600, resulted in dramatic reduction in the viscosity.

While in accordance with the patent statutes, the best mode and preferred embodiment has been set forth, the scope of the invention is not limited thereto, but rather by the scope of the attached claims.

What is claimed is:

1. A heterogeneous melt blend of CPVC and polystyrene, comprising:
   a continuous CPVC phase and a separate discontinuous polystyrene phase, said CPVC containing from 58 percent to about 72 percent by weight of chlorine therein, and an effective amount of said polystyrene to achieve an apparent viscosity reduction of at least 10 percent, the number average molecular weight of said polystyrene being from about 1,500 to about 5,000.

2. A blend according to claim 1, wherein said amount of said polystyrene is an effective amount to achieve an apparent viscosity reduction of at least 25 percent, and wherein said number average molecular weight of said polystyrene is from about 1,500 to about 5,000.

3. A blend according to claim 2, wherein said CPVC resin contains from about 61 percent to about 72 percent by weight of chlorine therein.

4. A blend according to claim 3, wherein said effective amount of said polystyrene achieves an apparent viscosity reduction of at least 50 percent.

5. A CPVC-polystyrene composition having a low melt temperature viscosity, comprising:
   a heterogeneous melt blended composition containing a continuous CPVC phase and a separate discontinuous polystyrene phase, said CPVC resin containing from 58 percent to about 72 percent by weight of chlorine therein, wherein the amount of said polystyrene is from about 0.5 part to about 10 parts by weight for every 100 parts by weight of said CPVC resin, and wherein the number average molecular weight of said polystyrene is from about 1,500 to about 5,000.

6. A CPVC-polystyrene composition according to claim 5, wherein the amount of said polystyrene is from about 1 part to about 8 parts by weight for every 100 parts by weight of said CPVC resin.

7. A CPVC-polystyrene composition according to claim 6, wherein said number average molecular weight of said polystyrene is from about 1,500 to about 5,000, and wherein the amount of said polystyrene is from about 2 parts to about 5 parts by weight for every 100 parts by weight of said CPVC resin.

8. A CPVC-polystyrene composition according to claim 6, wherein said CPVC resin contains from about 61 percent to about 72 percent by weight of chlorine therein.

9. A CPVC-polystyrene composition according to claim 7, wherein said CPVC resin contains from about 61 percent to about 72 percent by weight of chlorine therein.

10. A CPVC-polystyrene composition according to claim 7, wherein said polystyrene and said CPVC resin are melt blended at a temperature of from about 180° C. to about 260° C.

11. A CPVC-polystyrene composition according to claim 8, wherein said polystyrene has a Tg of 100° C. or less.

12. A CPVC-polystyrene composition according to claim 8, wherein said polystyrene has a Tg of 100° C. or less.

13. A CPVC-polystyrene composition according to claim 9, wherein said polystyrene has a Tg of 60° C. to 90° C.

* * * * *